May 19, 1936.  R. CHILTON  2,040,832
TRANSMISSION
Filed Oct. 5, 1934   4 Sheets-Sheet 1

INVENTOR.
ROLAND CHILTON
BY
ATTORNEY.

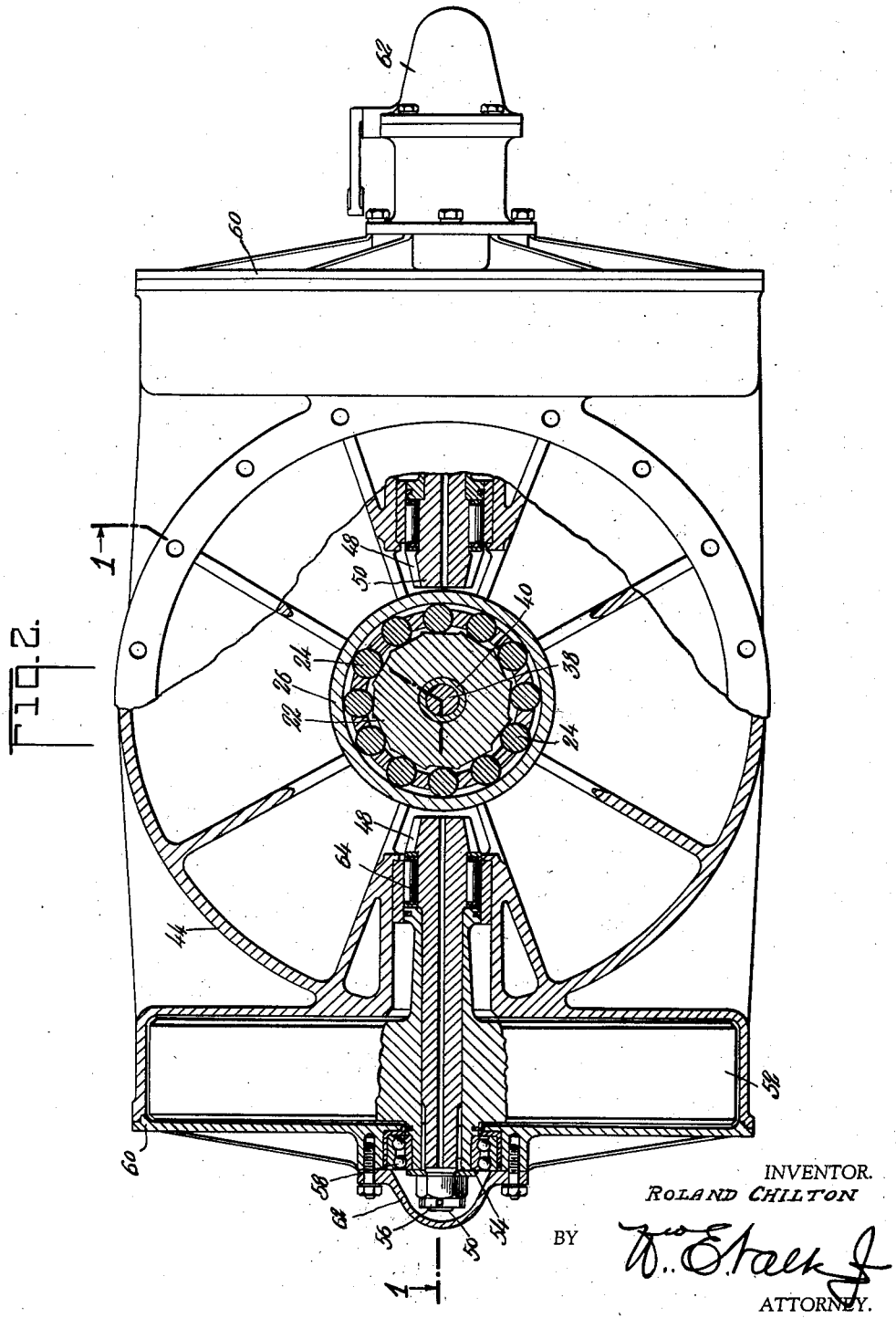

May 19, 1936.  R. CHILTON  2,040,832
TRANSMISSION
Filed Oct. 5, 1934   4 Sheets-Sheet 3
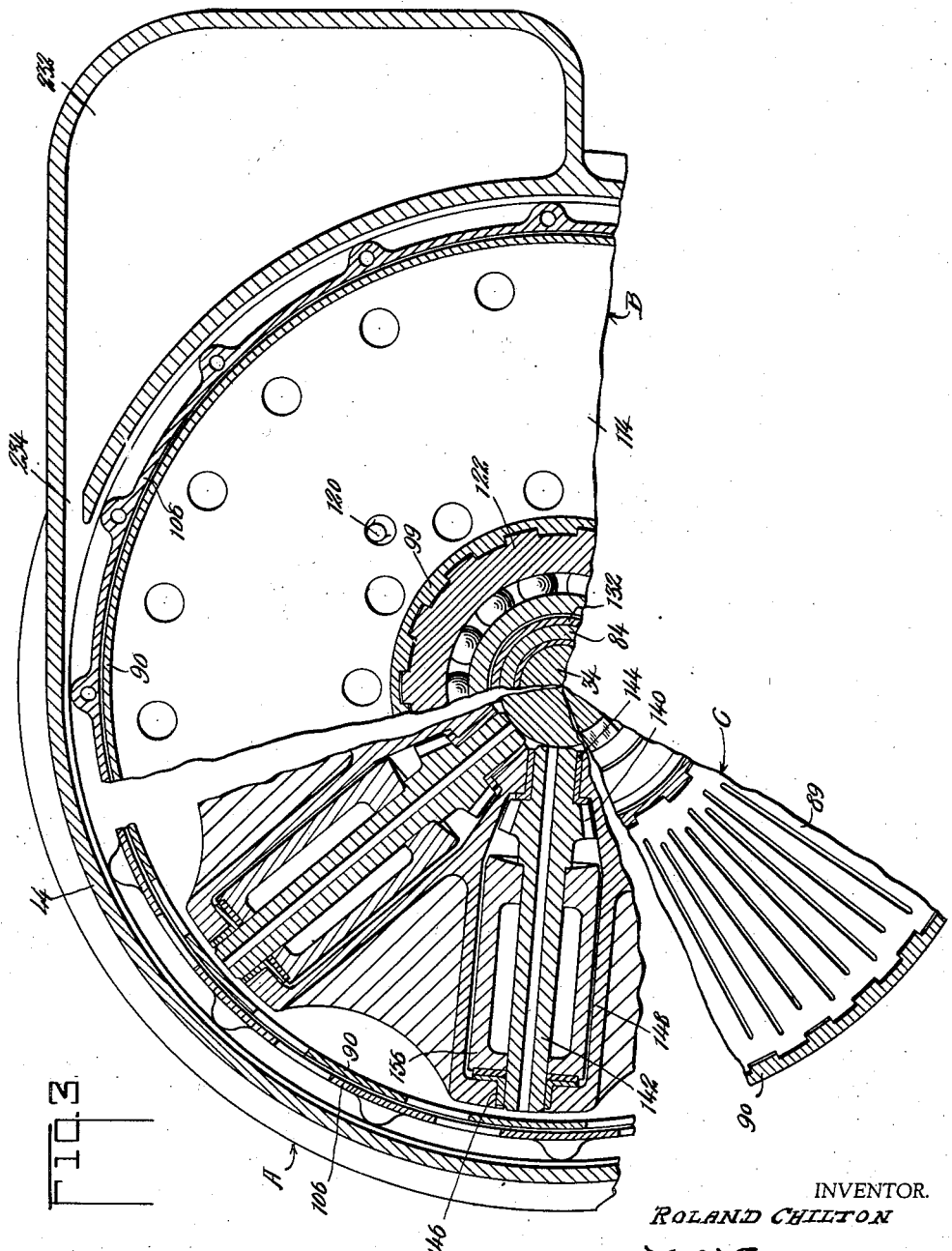
INVENTOR.
ROLAND CHILTON
BY
ATTORNEY.

May 19, 1936.                    R. CHILTON                    2,040,832
                                TRANSMISSION
                             Filed Oct. 5, 1934              4 Sheets-Sheet 4
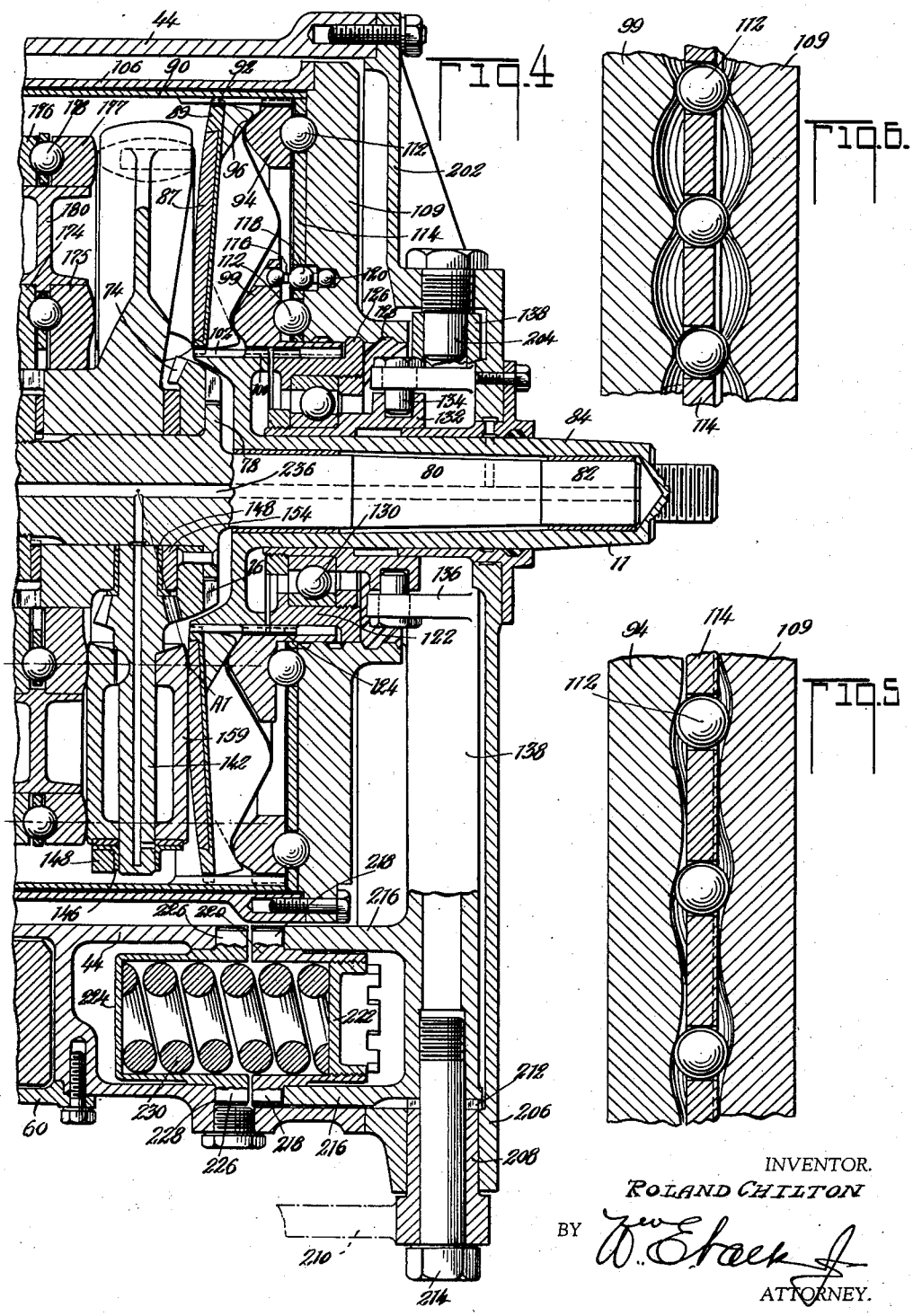
INVENTOR.
ROLAND CHILTON
BY
ATTORNEY.

Patented May 19, 1936

2,040,832

UNITED STATES PATENT OFFICE 2,040,832

TRANSMISSION

Roland Chilton, Ridgewood, N. J.

Application October 5, 1934, Serial No. 746,958

19 Claims. (Cl. 74—281)

This invention relates to transmissions of the type wherein rolling members are loaded into non-slipping driving contact by torque responsive means, and wherein certain members are relatively rockable to shift their contact points for change in ratio. In certain respects the invention comprises a continuing development of that type of transmission described and illustrated in co-pending applications Serial Nos. 669,144; 728,058; 742,751; 742,752 and 743,515.

In the preferred embodiment of the drawings, an automotive transmission, having a ratio range extending from one to zero to one to one and therebeyond into reverse and over-drive ratios is shown. These showings also include high speed regenerative flywheels comprising structural improvements in the system disclosed in my co-pending application Serial No. 732,182.

The improved transmission of this invention is of general utility, and not limited to combination with regenerative flywheel means, although many of the features of the invention are specifically aimed to meet the very onerous conditions set up in such an environment.

The kinetic flywheel system of regenerative drive imposes on the transmission much greater driving effort than the power source alone would be capable of exerting, and furthermore, these high torques are subject to frequent reversal as the vehicle (or other driven means) is controlled from acceleration to deceleration, relative to the flywheel, by change in ratio.

When a rocker member is rocked for shift of contact relative to an engaged member, the movements of approach and recess of respective ends of the rocker relative to the member are unequally related, and in this type of transmission this rocking action must be carried out whilst maintaining very heavy contact loads on the members. These contact loads are generated by torque responsive means whereby the contact loads are maintained sufficiently in excess of the instantaneous driving load to prevent slippage under all conditions. With the hard and lubricated rollers herein employed, the required contact loads are of the order of twenty times the driving effort to be transmitted, and the torque responsive devices comprise balls engaged between inclined tracks having a slope ratio of the order of one in twenty. Accordingly, should the unequal movements generated at the rocking member be transmitted to the torque responsive devices they would result in a back-lash thereat amounting to twenty times such movement, which would result in objectional impact under reversing torque.

Accordingly, a prime object of the present invention is to provide new and improved means to completely compensate for the rocking action without transmitting any movement to the torque responsive devices. Associated objects are to provide an anti-friction rocker control means capable of transmitting the very high contact pressures, and of effecting thereunder the required rocking action with a minimum of control effort.

A further object of the invention is to provide a rocker control system which shall be in stable equilibrium in all positions. A still further object is to provide a double sided construction wherein the contact loads and reactions cancel out between rigidly connected opposed members to the elimination of thrust bearings which have been a source of friction loss in certain transmissions of the prior art.

Many other objects will be obvious from, or will be pointed out in the ensuing description.

In the drawings:

Fig. 2 is an end view, with the left hand portion in section, on the line 2—2 of Fig. 1;

Figure 1:
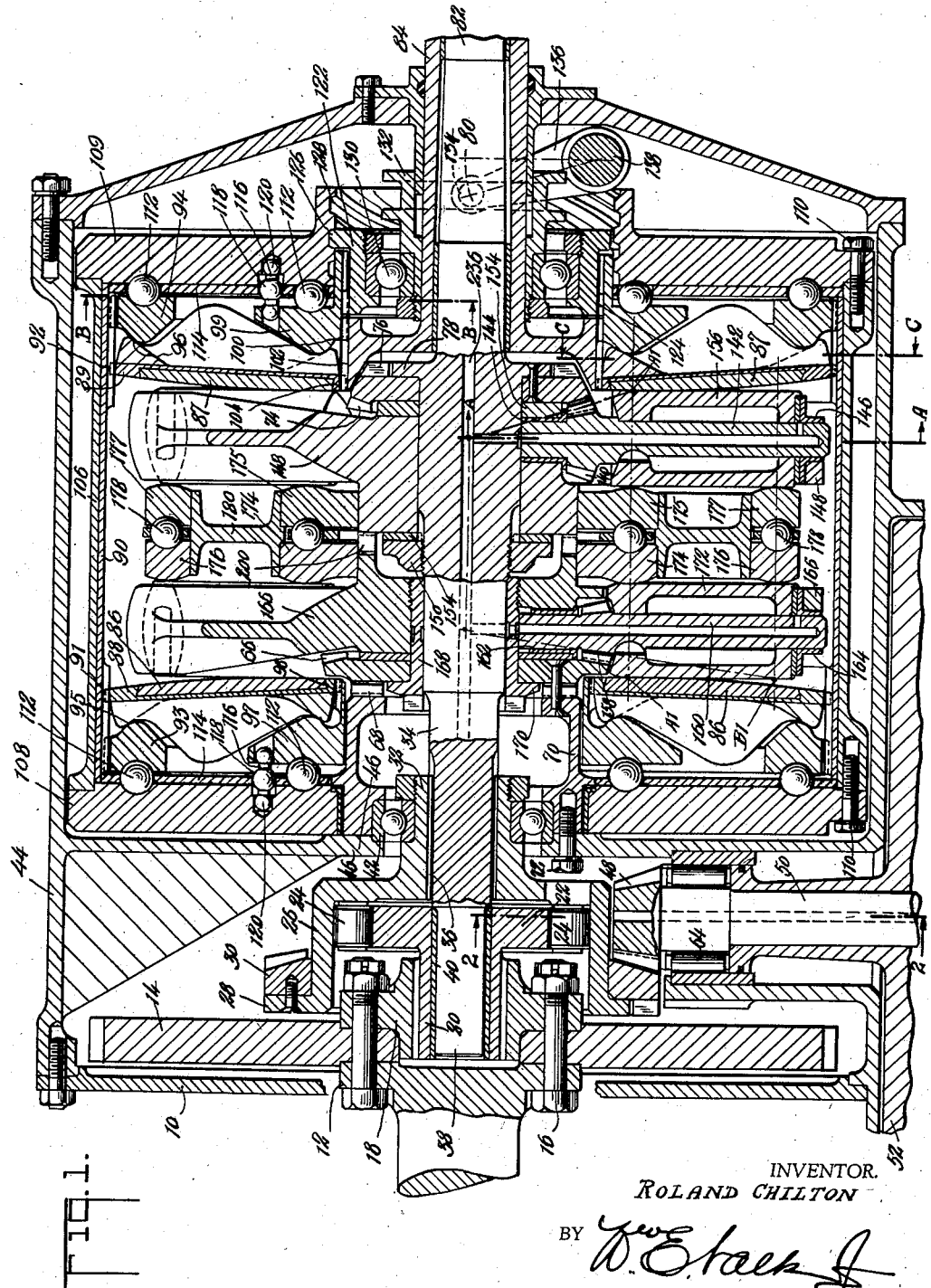
Fig. 1 is a sectional view on the line 1—1 of Fig. 2.

Fig. 3 comprises fragmentary transverse sections as follows:

Segment A on the line AA of Fig. 1;
Segment B on the line BB of Fig. 1;
Segment C on the line CC of Fig. 1;

Fig. 4 is a fragmentary sectional plan view showing the control shaft mechanism on enlarged scale; and Figs. 5 and 6 are developed views of the control cams.

Referring first to Fig. 1, 10 designates an end plate of a conventional engine (not shown) which engine has the usual crankshaft flange 12 to which is secured a conventional light engine flywheel 14 by bolts 16, which also secure a splined driving hub 18. Splined into this hub is a sleeve 20 integral with a cam 22 engaged by rollers 24 which in turn co-act with an external cylindrical member 26 to comprise a conventional one-way roller clutch.

The member 26 has a flange 28 to which is secured, as shown, a ring bevel gear 30, and the member 26 is further provided with a hub 32 splined to a main transmission shaft 34 as indicated at 36. The main shaft 34 has an extension 38 on which the cam 22 is free for rotation on a bushing 40. The hub 32 is mounted in a ball bearing 42, suitably clamped in the housing 44 which has a transverse wall 46 for this purpose.

Meshed with the bevel gear 30 are bevel pinions 48 integral with flywheel shafts 50 carrying massive flywheels 52, each secured by splines 54, and a nut 56 which also serves to clamp an outer ball bearing 58, which is also clamped in a flywheel cover 60 by a small cover 62. The inner end of the flywheel shaft 50 is supported on a roller bearing as shown at 64.

The fixed or reaction member of the transmission comprises a bevel gear 66 secured, by end splines 68, to a sleeve 70 which is in turn secured to the housing wall 46 by screws 72, which also serve to clamp the ball bearing 42.

The driving member of the transmission comprises a second bevel gear 74, of larger pitch cone angle than the reaction bevel gear 66, and this driving bevel gear 74 has end splines 76 engaging slots in a flange 78 integral with the main shaft 34. This shaft has an extension 80 whereon is piloted, by bushings 82, a driven shaft 84.

Organized for unitary rotation with the driven shaft 84 are the following elements comprising the driven member system, to wit: Two similar opposed crown faced distortable driven discs 86—87 are set into heavy carrier members 88—89. These carrier members are radially slotted (see also Fig. 3) to comprise a large number of individually rigid segments, which are, however, collectively distortable to change the angle of dish of the crown faced driven members 86—87 for rocking action thereof. The carrier members 88—89 are splined exterially into a floating connecting drum 90 as indicated at 91—92 and the splines in this drum are extended to also engage splines on outer control cam rings 93—94 which engage the inclined ends 95—96 of the segments of the carrier members 88—89.

Similarly an inner control cam ring 97 is splined at 98 into the inner periphery of the carrier member 88, and this cam ring 97 engages the inner inclined annular face of the carrier member 88.

A companion inner control cam ring 99 is splined at 100 onto a splined rim 102, integral with the driven shaft 84, and the inner periphery of the carrier member 89 engages this same spline at 104.

It will now be seen that the crown faced driven members 86—87, their carrier members 88—89, the outer control cam rings 93—94, the inner control cam rings 97—99 and the drum 90, are all drivably connected for unitary rotation with the driven shaft 84.

Floatingly embracing this driven assemblage is an exterior tension drum 106 to which are rigidly secured massive end plates 108—109 by screws 110. Between these end plates 108—109, and the inner and outer control cam rings 93—94, 97—99 are disposed anti-friction balls 112, engaging cam tracks in these members as shown in the developed views of Figs. 5 and 6. The profiles of the inner and outer cam tracks are so related as to compensate for the variable ratio of advance and retraction of the inner and outer peripheries of the carrier members 88—89, as the crowned contact faces of the driven discs 86 and 87 are rocked by rotation of the end discs 108 and 109, relative to the cam rings 93—94, 97—99. As already described these cam rings are all connected together for bodily rotation with the carrier members 88—89, and driven shaft 84.

The balls 112 are located in cages 114 which are in turn circumferentially located to partake of one-half of the relative control rotation between the end cam plates 108—109 and the cam rings 93—94, 97—99; by means of the small rocking beams 116 which have central spherical portions 118 engaging the cage 114, and end spherical portions 120 engaged in holes in the cam discs 108—109 and control rings 97—99 respectively. When the end cam plates 108—109 are swung through any specific angle relative to the cooperating cam rings 93—94, 97—99 the ball and cage assembly will travel through one-half of this angle due to the natural rolling action of the balls. It is the function of the spherical ended control beams 116 to prevent accidental displacement of the cage and balls during assembly, or should the parts come to zero contact load.

The relative control rotation between the end cam plates 108—109, and the associated cam rings 93—94, 97—99 is effected through axial travel of a control sleeve 122 which engages the splines 100 of the control cam ring 99 as shown at 124, and also engages at 126 with helical splines 128 formed in the end control cam disc 109. The sleeve 122 is moved axially through a ball thrust bearing 130 secured to a sliding control sleeve 132 engaged by pins 134 in levers 136 extending from a control rock shaft 138 (see Fig. 4).

It will now be seen that the drum 106 and the end cam plates 108—109 are free of all driving load, which is transmitted directly to the driven shaft 84 from the driven discs 86—87 through the various splined connections already described, leaving the enveloping control end cam and drum assemblage 108—109—106 rotationally floatable around the inner drive assemblage. The relation of these parts is determined by the position of the helically splined control sleeve 122 which is free to rotate unitarily with the driven parts by virtue of the ball bearing 130.

The planetary roller assemblage is divided into two parts as follows:

Firstly: Engaged with the driving bevel gear 74 are a plurality of pinions 140, integral with shafts 142 supported in bushings 144—146 in a cage 148, which cage is free for rotation on the shaft 34, being axially located thereon by a thrust nut 150 and opposed thrust washers 154—154. The shafts 142 carry rollers 156 engaged with the crown faced driven disc 87.

Secondly: Engaged with the fixed or reaction bevel gear 66 are pinions 158 integral with shafts 160 supported in bushings 162—164 in a cage 166 free for rotation on the shaft 34 on a bushing 168 having a flange 170 which comprises a thrust bearing locating the bevel gear 66 relative to the cage 166 and planet pinions 158. The shafts 160 carry rollers 172 engaging the crowned contact face of the driven disc 86. The cages 148—166 are rotationally connected by end-splines 200.

The planetary rollers 156—172 are drivably engaged by inner rotationally floating intermediate rings 174—175, and by outer floating intermediate rings 176—177, these rings also comprising torque responsive contact pressure means, being drivably connected by balls 178 engaging circumferentially inclined tracks or races formed in the opposed faces of the intermediate rings 174—175, 176—177. It will be seen that the inner intermediate rings 174—175 are free for rotation on a suitable journal portion formed on the cages 166—148, and that the outer rings 176—177 are located by a suitable annular spacer-bearing member 180 also free for rotation on the inner intermediate rings 174—175.

The axial reactions generated by the torque responsive balls 178, tending to separate the intermediate rings 174—175 and 176—177, are at all times proportional to the instantaneous driving effort transmitted by the respective rings, and these reactions supply the non-slipping contact loads and are resisted by the rigidly united end cam plates 108—109 being transmitted thereto through the control cam balls 112 as previously described. It is an important feature of this invention that the control cam profiles in the cam members 93—94, 97—99, 108—109 are so related as to maintain all the parts in stable equilibrium in all rocked positions of the crown faced driven discs 86—87 and so as to effect the rocking action without subjecting the torque responsive devices to movement.

In the one to one ratio position shown the contacts between the rollers 156—172 and the driven discs 86—87 fall on the points A₁—A₁ and under these conditions it will be obvious that the outer intermediate rings 176—177 are relieved of contact load. It will be observed that the point A₁ falls on an extension of the pitch cone line of the driving bevel gear 140, so that this contact of the roller 156 with the driven disc 87 necessarily gives the same driving ratio as that between the bevel pinions 140 and the driving bevel gear 74. Accordingly, in this position of contact (A₁), the driven disc 87 is held to unitary rotation with the driving gear 74 and driving shaft 34, i. e., the transmission is in one to one ratio. The companion point (A₁) of contact of the roller 172 with the companion driven disc 86 has an equal pitch cone angle wherefor the disc 86 is also driven at one to one ratio since companion points on the rollers are constrained to equal peripheral velocities by virtue of their driving connection through the intermediate members 175—174.

Attention is now called to the point (B₁) on the surface of the roller 172 which lies on an extension of the pitch cone of the bevel pinion 158 meshed with the fixed or reaction bevel gear 66. It will be seen that when the face of the driven disc 86 is rocked to contact at this point the driven disc will be held to unitary rotation with the fixed gear 66, i. e., the transmission will be in one to zero ratio. Functionally, the roller 172 may be considered as a mere (toothless) extension of the pinion 158 which then becomes a planetary bevel engaged by two members, i. e., the gear 66 and the driven disc 86. It is obvious that if one of these members be fixed the other must also be held to zero rotation (regardless of the speed of planetization of the roller) whenever the contacts subtend the same pitch cone angle. It should be noted that the bevel pinion 158 has teeth of "long addendum" form which is the reason that the pitch cone line falls near the root of the pinion tooth.

It should now be obvious that movement of the contact point (by rocking of the driven discs) from A₁ to B₁ will progressively change the driving ratio from one to one, to one to zero and that movement outwardly beyond B₁ will give reverse ratios while movement inwardly beyond A₁ will give over-speed drive. It will also be obvious that, by suitably proportioning the pitch cone angles of the bevel gears, the location of the points A₁ and B₁ may be varied to give various extensions of the ratio range into the reverse and over-speed zones. The following limitation should now be noted. The radius of the point A₁ is shown as approximately one half of that of the point B₁, under which condition the cages 148—166 will planetize backwards at the same speed as the forward speed of the driving shaft 34. As the points A₁ and B₁ are brought closer together (by change in the relative bevel gear pitch cone angles) the range of over-speed and reverse ratios is increased at the expense of increased speed of backward cage rotation.

Referring now to the control rock shaft 138 (best seen in Fig. 4), there is provided a trunnion bearing pin 204 screwed into the rear cover 202, and projecting therein to support the inner end of the control rock shaft 138. Supported in a boss 206 in the rear cover 202 is a hub 208 of an external control lever 210 and this hub is end-splined at 212 into the end of the rock shaft 138 being secured thereto by the large cap screw 214.

The rock shaft is provided with lever arms 216, terminating in half bearings engaging trunnions 218 formed integral with a swinging sleeve 220 provided with an adjustment plug 222. A companion sleeve 224 has trunnions 226 engaged in bearings in the housing 44 as indicated at 228. Disposed within the sleeves 220—224 is a heavy compression spring 230 and the assemblage just described comprises a spring loaded toggle which exerts zero turning moment on the rock shaft 138 when the levers 216 are coplanar with the bearings 228 of the trunnions 226, in which position the toggle mechanism is on "dead center" which is arranged to occur when the rock shaft 138 and the driven discs 86—87 are in their mid-position.

As the discs are rocked from this position of zero distortion the axis of the spring toggle assemblage is rocked out of the plane of the section of Fig. 4 and as this angulation proceeds increasing reactions from the spring 230 are exerted on the rock shaft 138 to balance the force required to elastically distort the driven discs 86—87.

It will be understood that the spring 230 is adjusted by means of the screw cap 222 so that, in either extreme rocked position, the turning moment due to the spring pressure on the levers 216 is sufficient to hold the control system against the reactions necessary to distort the driven discs 86—87, thus balancing the system and relieving the control lever 210 of any load from the "stiffness" of these discs.

Referring now to Fig. 3, there will be noted an elevated sump 232, communicating with the interior of the housing 44, through the upper slot 234, which serves to keep the housing 44 "bailed out" due to the high speed rotation of the drum 106 which continuously splashes oil back into the sump 232 from which it flows by suitable connections—not shown—into the central hole 236 in the main shaft 34 from which it is led to lubricate various cage bearings.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. The combination with transmission members to be rocked by unequal opposite movements of their inner and outer ends, of a control means comprising inner and outer cam tracks so profiled as to effect said inequality and at the same time conform to said inequality.

2. A transmission including in combination, rollers and discs contacted for rocking movement, means urged to separation to enforce said contact, and control means having cam tracks so profiled as to effect said movements whilst preventing said separation.

3. In a transmission, in combination, opposed drive members, rollers rockably contacted between said members under high contact load, and opposed cam means rigidly united against relative movement under said load and profiled to effect said rocking whilst transmitting said load.

4. A transmission including, in combination, radially extended planet rollers, and torque responsive contact pressure means comprising driving connections between said rollers near respective ends thereof.

5. A transmission including, in combination, radial planetary rollers, opposed discs drivably contacting said rollers, and means engaged between respective ends of said rollers adapted to enforce said contact.

6. In a transmission, in combination, members having rigidly related opposed cam tracks, and drive members rockably contacted under heavy pressure, said tracks being so profiled as to rock said members whilst transmitting said pressure.

7. In a transmission, an opposed pair of annular members, roller members rockably contacted therewith under heavy pressure, and cam discs rotatable with respect to said members and profiled to conform with said rocking movement.

8. In a transmission, in combination, arcuate rocker members, and a control means having concentric cam tracks effective at respective ends of said rocker members, said tracks being so shaped and related as to compensate for the unequal approach and recess of said ends characteristic of arcuate rocking action.

9. In a transmission, in combination, an opposed pair of rigidly related discs each having inner and outer cam tracks, and drive members disposed between said discs and rockably contacted under high pressure, said cam profiles being so related as to effect said rocking whilst transmitting said pressure.

10. In a transmission, in combination, a disc and a roller rockably contacted, and a control member having concentric cam tracks adapted to effect said rocking.

11. In a transmission, in combination, opposed drive members rockably related, and opposed discs each having concentric cam tracks adapted to control said rocking.

12. In a transmission, in combination, drive members rockably related for contact shift by simultaneous but unequal in and out movements of respective ends, and a control member having cam tracks effective at respective ends and profiled to compensate for said inequality.

13. In a transmission, a disc and a plurality of rollers rockably contacted for in and out movement at respective margins, means urged to movement to load the respective margins, and load transmitting means including cam tracks profiled to effect the first and to prevent the second said movement.

14. A transmission comprising two axially opposed assemblages each including a roller member and a disc member rockably contacted, and a disc cam having tracks profiled to effect said rocking by rotation relative to said members.

15. In a transmission, in combination, a pair of rollers, a pair of discs rockably contacted thereby, contact pressure means urging separation between said rollers, and disc cams organized to effect said rocking and to prevent said separation.

16. In a transmission, in combination, a roller and an annular disc rockably contacted under pressure for opposite movements at their inner and outer margins, and disc cam means adapted to effect said movements and to maintain said pressure.

17. A transmission including, in combination, a pair of symmetrically opposed driven members, a pair of radial planetary rollers drivably engaged between said members for contact shift lengthwise of the rollers, and torque responsive contact pressure means engaged between said rollers.

18. In a transmission, in combination, radially elongate planet rollers, and torque responsive contact pressure means engaged between said rollers toward respective ends thereof.

19. In a transmission, a drive member, a roller rockably contacted with said drive member, torque responsive means engaging said roller, and control cam means profiled to maintain stable equilibrium in all rocked positions of contact between said member and said roller without subjecting the torque responsive means to movement.

ROLAND CHILTON.